(12) United States Patent
Kline et al.

(10) Patent No.: US 6,609,001 B2
(45) Date of Patent: Aug. 19, 2003

(54) APPARATUS AND METHOD FOR PROVIDING SIGNAL QUALITY MEASUREMENTS IN DRIVE TEST SYSTEMS FOR WIRELESS NETWORKS

(75) Inventors: Paul A. Kline, Gaithersburg, MD (US); Jay S. Gilbertson, Mount Airy, MD (US)

(73) Assignee: Dynamic Telecommunications, Inc., Germantown, MD (US)

( * ) Notice: Subject to any disclaimer, the term of this patent is extended or adjusted under 35 U.S.C. 154(b) by 0 days.

(21) Appl. No.: 10/067,654

(22) Filed: Feb. 5, 2002

(65) Prior Publication Data

US 2002/0151318 A1 Oct. 17, 2002

Related U.S. Application Data

(60) Provisional application No. 60/266,947, filed on Feb. 7, 2001.

(51) Int. Cl.$^7$ ................................................. H04Q 7/20
(52) U.S. Cl. ...................... 455/423; 455/67.3; 455/67.1
(58) Field of Search ................................... 455/423, 424, 455/434, 503, 67.1, 67.3, 67.4

(56) References Cited

U.S. PATENT DOCUMENTS

| | | | |
|---|---|---|---|
| 4,723,303 A | 2/1988 | Koch | |
| 5,148,548 A | 9/1992 | Meche et al. | |
| 5,451,839 A | * 9/1995 | Rappaport et al. | ......... 455/423 |
| 5,630,210 A | 5/1997 | Marry et al. | |
| 5,926,762 A | 7/1999 | Arpee et al. | |
| 6,052,566 A | 4/2000 | Abramsky et al. | |
| 6,256,486 B1 | 7/2001 | Barany et al. | |
| 6,278,723 B1 | 8/2001 | Meihofer et al. | |

OTHER PUBLICATIONS

"Optimizing Your GSM Network Today and Tomorrow: Using Drive–Testing to Troubleshoot Coverage, Interference, Handover Margin and Neighbor Lists", Application Note 1344, Agilent literature No. 5980–021E, May 2000.*

Bill Walkowski, "Identifying the Culprits", Wireless Review, Jan. 15, 2001. http://www.wirelessreview.com.*

Hamish Butler, "Propogation Ping–Pong", Wireless Review, Apr. 1, 2000, http://www.wirelessreview.com.*

Module–repair Tester at a Go/No Go Tester Price.—Telecommunications News, Issue 18, International Edition, (Hewlett Packard, Jun. 1999), pp. 5–6.

Optimize GMS Networks with a Receiver–based Network Lifecycle.—Telecommunications News, Issue 18, International Edition. (Hewlett Packard, Jun., 1999), pp. 6–8.

TEMS Light, Full Indoor Cellular Coverage Just an Arm's Length Away.—(Ericsson NetQual INc., 2001). www.ericsson.com.

Janus Christian Krarup, Engineering Filed Options Menu.—1998. http:/www.tele–servizi.com/janus/engfield1.html.

* cited by examiner

*Primary Examiner*—Dwayne Bost
*Assistant Examiner*—James K. Moore
(74) *Attorney, Agent, or Firm*—Roberts, Abokhair and Mardula, LLC

(57) ABSTRACT

An apparatus and method for assessing the signal strength, quality and sources of interference in a wireless network. A drive test is performed using a receiving scanner in a geographic area that contains a plurality of base stations within a carrier's wireless network. The receiver and companion logic measure, analyze and record synchronization channels across all the frequencies used by the local base station. Signal quality is computed and expressed in the form of RxQual. Multiple readings are taken in a brief time period (~480 msec) thus an average, representative quality is assessed. Signal fading, degradation, and interference are calculated using corelative techniques, for each used frequency. If the signal quality level is insufficient, then a scan for adjacent channel and co-channel interference is done. The data and analyses are used by the carrier to fine tune the wireless network system.

20 Claims, 3 Drawing Sheets

APPARATUS AND METHOD FOR PROVIDING SIGNAL QUALITY MEASUREMENTS IN DRIVE TEST SYSTEMS FOR WIRELESS NETWORKS

CROSS REFERENCE TO RELATED APPLICATIONS

This application claims priority under 35 U.S.C. §119(e) from provisional application No. 60/266,947, filed Feb. 7, 2001. The 60/266,947 provisional application is incorporated by reference herein, in its entirety, for all purposes.

FIELD OF THE INVENTION

The present invention relates generally to wireless networks, such as GSM systems, and in particular, to a method and apparatus for measurement and analysis of signal quality including causes of quality loss.

BACKGROUND INFORMATION

Tracking the rapid increase of wireless networks, the wireless industry is increasingly focusing on high quality of service, which is a competitive advantage for a wireless service provider. There are several elements to quality of service: (1) coverage, (2) speech quality, (3) network accessibility (sometime called capacity) and (4) number of dropped calls. One of the tools used to ensure network quality is a drive test system.

Various wireless protocols exist for defining communications in a mobile network. One such protocol is a time-division multiple access (TDMA) protocol, such as the TIA/EIA-136 standard provided by the Telecommunications Industry Association (TIA). With TIA/EIA-136 TDMA, each channel carries a frame that is divided into eight time slots (two slots are consumed six time slots to support multiple (3 or 6) mobile units per channel. Other TDMA-based systems include Global System for Mobile (GSM) communications systems, which use a TDMA frame divided into eight time slots (or burst periods).

GSM has been the European standard and occupies the frequency ranges at 900 MHz and 1800 MHz. The U.S. version of GSM, GSM 1900 operates at 1.9 GHz.

A cellular communication system essentially consists of a plurality of cell sites, or base stations, well positioned throughout a geographical region, a Mobile Telephone Switching Office (MTSO), and a plurality of mobile units. Each cell site has a high power antenna system coupled to a transmitter and a receiver, which utilize a plurality of channels each comprised of forward control channels (FOCC), a reverse control channel (RECC) forward voice channels (FVC) and reverse voice channels (RVC). The mobile telephone switching office (MTSO) acts as a central coordinating site for the entire cellular network. Each cell in the network connects to the MTSO that, in turn, is connected to a conventional land telephone network.

When a subscriber initiates a call from a mobile unit, a call initiation request is placed on a reverse control channel (RECC). The mobile unit transmits its Mobile Identification Number (MIN), Electronic Serial Number (ESN), and Station Class Mark (SCM), along with the destination telephone number. If a cell cite successfully receives this information, it is forwarded to the MTSO, which may check to see if the subscriber is registered or not, and then assigns the call to a forward and reverse voice channel pair (FVC and RVC) of a public switched telephone line and the conversation commences.

When a subscriber receives a call, the incoming call is received by the MTSO that directs each cell site to transmit on its FOCC a paging message containing the subscriber's mobile identification number (MIN). Each mobile unit constantly monitors the FOCC and when its MIN is successfully detected, the mobile unit transmits an acknowledgement signal on the reverse control channel (RECC). Upon a particular cell site receiving the acknowledgement signal, the MTSO directs that site to simultaneously issue a FVC and a RVC pair. In this manner, the conversation is carried out on a dedicated channel pair separate from the control channels.

Throughout a typical conversation, as the mobile unit travels throughout the service area, the MTSO coordinates and issues numerous "handoffs" which automatically switch subscribers to different voice channels at different cell sites throughout a service area. Handoff decisions are made by the MTSO when the signal strength or quality on the RVC falls below a predetermined threshold level. The carrier periodically adjusts threshold levels with market and system growth, and as call traffic patterns and interference require.

If a new call for a mobile unit comes in and all of the voice channels of the particular cell site receiving the acknowledgement signal are occupied, then the MTSO directs the cell site to issue a directed retry to the subscriber which directs the subscriber to switch to a different control channel on another cell. Depending on the radio propagation effects and the specific location of the mobile unit, this procedure may or may not result in a successful call.

Factors including the performance of the MTSO, specific channel assignments made, relative number and location of the cell sites, and the set signal threshold levels may contribute to degradation in cellular service resulting in poor voice or data quality as well as dropped or incomplete calls.

In order to monitor a cellular network's performance, detect fraudulent users, and troubleshoot problems, a service provider must be able to monitor the various control and voice channels. Monitoring real-time signals and signal to interference ratios at various locations in a service area is desirable and will allow a carrier to fine tune the network to improve its quality. A drive test that monitors all channels across multiple base station service areas will provide the necessary data.

There are three types of systems used in drive testing wireless networks: (1) phone-based, (2) receiver-based and (3) phone and receiver-based. Typically in a system where a phone is present, a call quality parameter is read from the phone as a measure of signal quality. For example, in a GSM network the call quality parameter is called RXQual. The RXQual parameter is a 3-bit value (i.e., binary range of from 000 to 111 or in decimal notation 0 to 7) and uses the 26-midample training sequence bits (over several frames). Table 1 converts bit error rate (BER) to RXQual.

TABLE 1

| Correlation of BER to RXQual levels | |
|---|---|
| <0.2% BER | RXQUAL0 |
| 0.2%–0.4% | RXQUAL1 |
| 0.4%–0.8% | RXQUAL2 |
| 0.8%–1.6% | RXQUAL3 |
| 1.6%–3.2% | RXQUAL4 |
| 3.2%–6.4% | RXQUAL5 |
| 6.4%–12.8% | RXQUAL6 |
| >12.8% | RXQUAL7 |

This parameter, RXQual, is then plotted in a geographical area to show the quality of the network at a certain location.

In areas where the signal strength is high and RXQual indicates poor signal quality, the service provider will typically adjust the base station to achieve better quality.

The problem with the current drive test methods is that typically only one channel (called "best server") is monitored per phone and, in case of a GSM network, each phone takes 480 ms to make one RXQual Measurement. This leads to both low resolution in each channel and few channels being measured. The disclosed invention uses a receiver-based system instead of a phone-based system to more rapidly measure signal quality for all channels.

Further, the measurement does not yield the source of quality problems. Adjacent channel and co-channel interference goes undetected. Network tuning is iterative, time consuming and difficult. Data collected are empirical and analysis reports static conditions. Predictive models of where to place cell transceivers, what channel frequencies to use, what handoff thresholds to employ, and what power levels to use are far from foolproof.

It has been recognized that signal strengths of a mobile system network channels deviate from a predictive model. U.S. Pat. No. 5,926,762 to Arpee et al. describes a method using a scanning receiver to map signal strengths of various channels across a network of base transmission stations by recording signal strengths received during a drive test, the location of the drive test unit (using an automated positioning system) and the channel frequency. These data are compared to predictive signal strength data for the various channels as stored in a database.

Deficiency in measured signal strength relative to predicted strength is ascribed by Arpee to interference from adjacent channels and co-channels. Interference sources are inferentially derived based on frequencies of nearby channels. Corrective action is taken to re-assign those ineffective frequencies to different cells. Further, modification of the predictive model algorithm reflecting actual experience may be implemented. Signal interference is charted across the cells' geographies. New cells to be added to the system are located where coverage is needed and where interference will be minimized.

Rappaport, et al. in U.S. Pat. No. 5,451,839 describes a system and method for collecting reception signal data during a drive test using a radio receiver serially linked to a portable computer. The reception frequencies are incremented by a fixed amount so that multiple channels may be measured. Scanning is done across data and voice channels. The data are stored and analyzed for troubleshooting. Rappaport does not disclose performing multiple scans of each channel.

U.S. Pat. No. 6,256,486 to Barany et al. describes a method and apparatus to measure co-channel interference by receiving a burst transmission from traffic control signaling and detecting deviations from the expected signal. Typically a training sequence is measured and compared against a recreated signal based upon a training sequence that is free of interference. Received signal strength indicator (RSSI) for the measured burst transmission is compared to a RSSI of the recreated burst to deduce a co-channel interference effect. A mobile switching center (MSC) controls the channel reuse. Any channel that shows a currently high level of interference will not be reused by the MSC. While this method identifies channels within a cell that have excessive RSSI, remedial action to avoid interference is not suggested.

U.S. Pat. No. 5,148,548 to Meche and Chaplain discloses that co-channel and adjacent channel interference is detectable by measuring RSSI. As RSSI exceeds a threshold level (thus indicating a signal strength in excess of a predetermined level of RSSI) interference is likely occurring. By simultaneously monitoring adjacent channels and co-channels, the adjacent channel and co-channel interference sources are identifiable. Frequency reuse algorithms can then take advantage of this data to limit reuse of channels with high interference including placing a voice channel (VCH) onto an idle queue. RSSI measurements are done at the cell base station and only detect interference when another VCH at the same or adjacent frequency is active.

Marry et al. discloses in U.S. Pat. No. 5,630,210 that measuring bit error rate allows deduction of interference levels and reception quality, expressed as RXQual level. The source of interference is not identified.

Interference levels have been found to fluctuate over time. U.S. Pat. No. 6,032,026 to Seki et al. discloses a process that measures signal to interference ratio (SIR) over an extended time period, averaging SIR over multiple readings so to militate against interference volatility.

U.S. Pat. No. 4,723,303 to Koch discloses that a continuous monitoring of transmissions in progress from a cell can distinguish interference from fading by assessing the rapidity of signal quality fluctuation. Rapid fluctuations are indicative of co-channel interference whereas slow fluctuation indicates a fading condition.

Abramsky et al. disclose that interference in the form of intermodulation (IM) may be caused when different wireless systems (e.g., CDMA, a broadband system, and AMPS, a narrow band system) are transmitted in close proximity. Their U.S. Pat. No. 6,052,566 teaches that signal to noise ratio (SNR) can detect IM effects, thus allowing a mitigation of a reported interference when IM is present. Abramsky also uses RSSI as a measurement value for detecting interference.

O'Donnell describes a method of mapping signal quality by having a mobile station traverse through a mobile network measuring signal quality. The signal quality is mapped and color-coded. For example, a dropped call may be colored black on a mobile network system map. This way, a visual inspection will reveal areas where cellular coverage is insufficient and the carrier can add coverage accordingly.

What would be desirable is a method and system for detecting channel interference based on signal quality and capable of discerning signal degradation due to fading, due to co-channel interference and due to adjacent channel interference as well as the identity of the interfering channel frequency. Further, it would be desirable if the measurement and detection would be equally effective during busy as well as idle voice transmission periods. Assessment of interference based on multiple readings would allow for smoothing interference levels is also desirable. It would also be desirable to assess the signal quality and source of poor quality rapidly for each and every channel transmitted by a given base station.

It is desirable to make the readings and assessments in the geographical area covered by the multiple cells within a mobile network system. In this way, a carrier is able to detect cellular service deficiencies experienced by its clients in where the clients are using their mobile units. This type of analysis allows carriers to take remedial action by assigning different channel frequencies and power levels such to eliminate much of the problems in a quick and efficient manner.

BRIEF SUMMARY OF THE INVENTION

It is therefore an object of the present invention to quickly and accurately measure signal quality for all channels of a wireless network during drive testing, not just the "best server."

It is still a further object of the present invention to improve the resolution of signal quality for all channels of a wireless network.

It is yet another object of the present invention to analyze reasons for lack of signal quality of channels of a wireless network.

It is a further object of the present invention to reduce processing requirements during drive testing by only checking poor signal quality channels for co-channel and/or adjacent channel interference.

It is still a further object of present invention to use a correlative analysis to detect signal degradations from multiple, rapidly received bursts of signals from the synchronization channel.

It is yet another object of the present invention to use a correlative analysis to detect frequency selective fading effects of the channel causing distortion of the signal not arising from noise or interference.

It is yet a further object of the present invention to use a correlative analysis to estimate the proportion of desired to undesired signal power. Signal to interference ratio (SIR) estimate is made for each burst signal. When multiple estimates are taken together, an average SIR value over the fading contour of the channel is calculated.

It is still a further object of the present invention to use correlative techniques in conjunction with non-coherent techniques to provide the performance information without knowledge of the carrier phase.

The present invention employs a receiver for a drive test application wherein the raw bit error rate is obtained from the signal degradation parameters of the physical layer modulation of the symbols due to noise and interference instead of from the actual bit rate error encountered after decoding. A receiver analyzes all of a cell's channel frequencies. Correlative techniques are used to assess signal degradation, signal fade, noise and interference. Further adjacent channel and co-channel interference can be separately assessed.

DETAILED DESCRIPTION OF THE INVENTION

Figure 1:
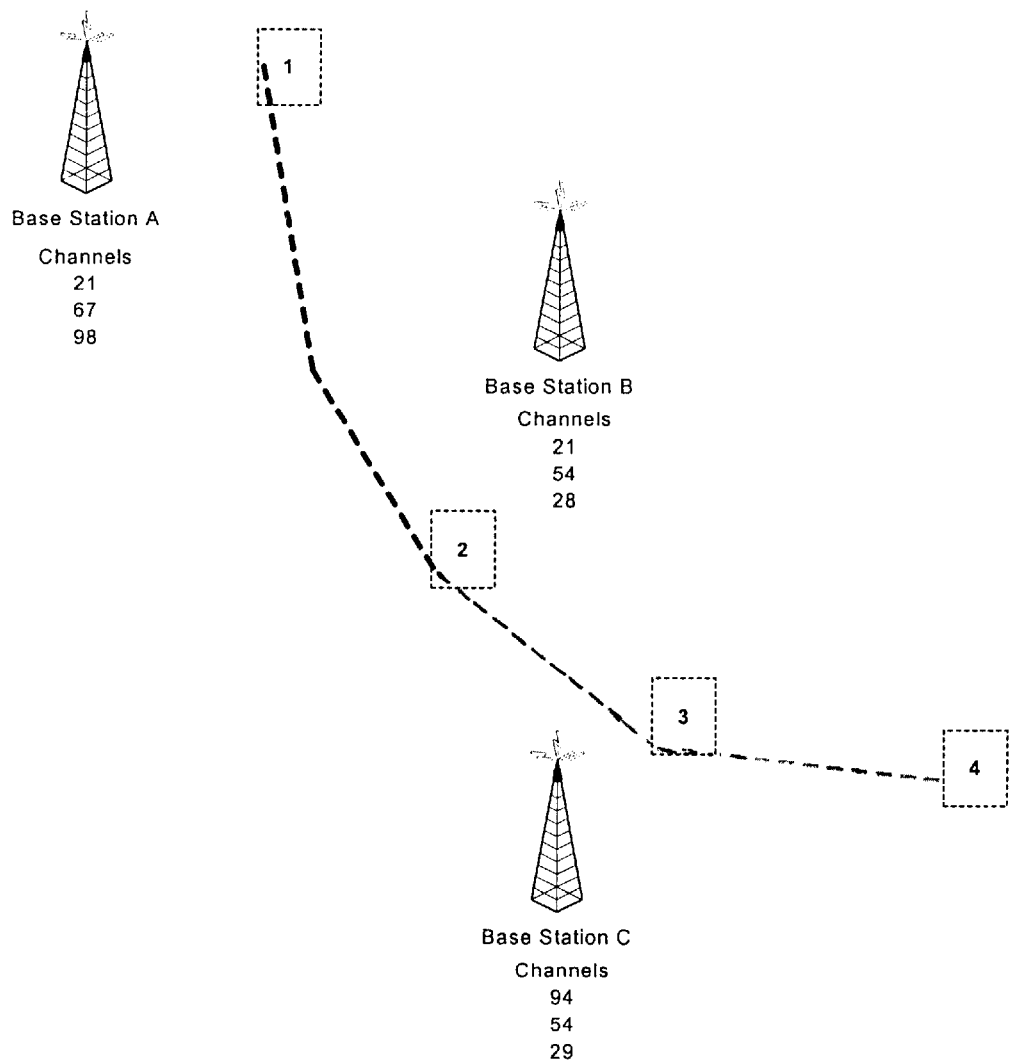
FIG. 1 illustrates schematically an example of a wireless system base station arrangement having deficiencies that would result in poor signal quality channel assignment according to the prior art, yet is particularly suited for application of the present invention.

The method and apparatus according to the present invention described herein ensures the completeness and lack of ambiguity of signal quality measurements during a drive test. It provides rapid information on multiple channels beyond what is customarily provided by the drive-test measurement systems known in the art.

According to an exemplary embodiment of the present invention, an apparatus is capable of assessing a wireless network in an extended geographic area. The apparatus has a scanning receiver and a controller. The scanning receiver is adapted to receive a plurality of channels of a base station in the wireless network. The controller is connected to the scanning receiver and is adapted to assess signal quality for each of the channels. The controller is advantageously implemented via a microprocessor, either one native to the scanning receiver and provisioned with instructions to implement logic according to the present invention, or one in a computer that is exogenous to the scanning receiver and connected thereto via a data link.

The system uses a wireless measurement receiver, such as a SeeGull Scanning Receiver available from Dynamic Telecommunications (12810 Wisteria Dr., 3rd Flr., Germantown, Md. 20876), whose capabilities are incorporated herein by reference, to measure multiple channels more rapidly then a phone-based system. In the case of GSM, the RXQual parameter defines the performance of a Raw Bit Error Rate estimated over the period of approximately 480 ms. This estimate of error rate is determined, not from the actual bit error rate encountered after decoding, but from the signal degradation parameters of the physical layer modulation of the symbols due to noise and interference. This can be done in several ways and the preferred embodiment follows.

During the defined measurement time, 10 synchronization channel (SCH) type bursts occur. SCH uses a 64 bit training sequence. The training sequences of these 10 bursts are analyzed to find the level of signal degradation present in the channel. Using correlative techniques, the SCH training sequence is located.

Next, the correlative techniques calculate the impulse response estimate of the channel. This is necessary to account for frequency selective fading effects of the channel that cause distortion of the signal not arising from noise or interference such as the multipath phenomena.

There may be a need for equalization correction for multipath phenomena. At the mobile frequencies bands, radio waves reflect from buildings, cars, hills, etc. Thus, many reflected signals, corrupting reception, are received with different carrier phases. An equalizer extracts the signal of interest from the received signal. It estimates the channel impulse response of the mobile system and then constructs an inverse filter. The receiver has logic to detect the training sequence it must wait for. The equalizer, by comparing the received training sequence with the training sequence it was expecting, computes the coefficients of the channel impulse response. In order to extract the signal of interest, the received signal is passed through the inverse filter.

Then, the correlative techniques provide a way of finding the proportion of desired to undesired signal power. This produces linear values of SIR (Signal to Interference Ratio) of the SCH training sequence bits. Since the channel is slow fading, each SIR estimate is valid for the respective burst, yet the values are taken together to provide an average SIR value over the fading contour of the channel.

Finally, the correlative techniques are performed with non-coherent techniques to provide the performance information without knowledge of the carrier phase.

The average linear SIR value found during the measurement is passed to Table 2 to determine the value of RXQual to be returned. The SIR values shown in Table 2 are in linear format and are convertible to logarithmic format per the equation: SIR [dB]=10 log (linear SIR).

TABLE 2

SIR (linear) to RXQual Conversion

| SIR (linear) | RXQUAL |
|---|---|
| SIR > 145.0 | 0 |
| 72.0 < SIR < 145.0 | 1 |
| 36.0 < SIR < 72.0 | 2 |
| 17.5 < SIR < 36.0 | 3 |
| 8.33 < SIR < 17.5 | 4 |
| 3.73 < SIR < 8.33 | 5 |
| 1.46 < SIR < 3.73 | 6 |
| SIR < 1.46 | 7 |

The result is a complete quality representation of the wireless network. The conditions shown in FIG. 1 are a good example of a wireless system that a phone-based system would improperly diagnose. As illustrated, Base Station A and B use channel 21, hence there could be co-channel interference on this channel resulting in poor signal quality. A phone-based monitoring system would find the co-channel problem for channel 21. However, channel 54 may also be problematic between Base Station B and C. A phone-based system measuring Channel 21 would not have identified this problem.

A phone-based system would fall short in the example. The receiver-based system of the present invention will identify signal quality issues for all channels, including co-channel interference on channel 54 as well as channel 21. Adjacent channel interference that may be present, such as between channels 28 and 29 and across Base Stations B and C, in this example, would be detected and reported.

A further improvement can be made when measuring a signal quality indicator and other parameters that may cause degradation in quality. For instance, co-channel interference may require high acquisition time, data storage and processing power for each measurement. The measurement is usually not necessary if the RXQual indicates good signal quality. The receiver-based system with logic that initiates interference measurements only when RXQual exceeds a threshold, provides a system that gives the entire network quality representation, and provides analysis to identify the cause of reduced quality.

Figure 2:
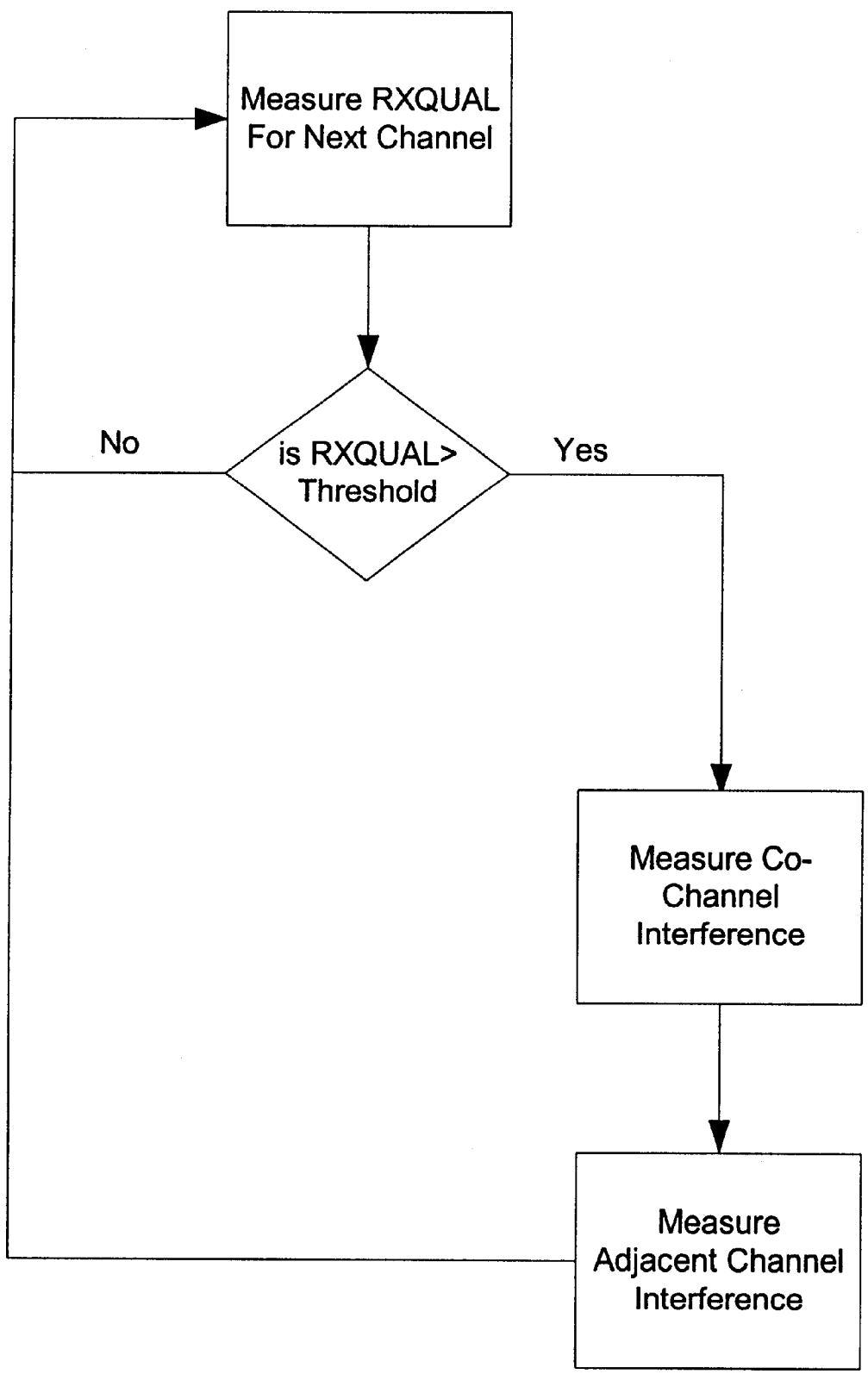
FIG. 2 illustrates a locic diagram for GSM network testing in accordance with the present invention.

The logic flow for the present invention is diagrammed in FIG. 2. As shown in the figure, RXQual for a first channel is measured. If the signal is of sufficient quality such that RXQual indicates minimum acceptable quality, then co-channel interference and adjacent channel interference testing can be skipped to save time and processor load. RXQual for the next channel is then measured.

If the RXQual is above the threshold, i.e., the signal is of less than desired quality, then a scan for co-channel interference and adjacent channel interference is made. By identifying the source of channel interference, the carrier can assess the cause of the poor signal quality. The cycle is then started again with measuring RXQual for the next channel.

Figure 3:
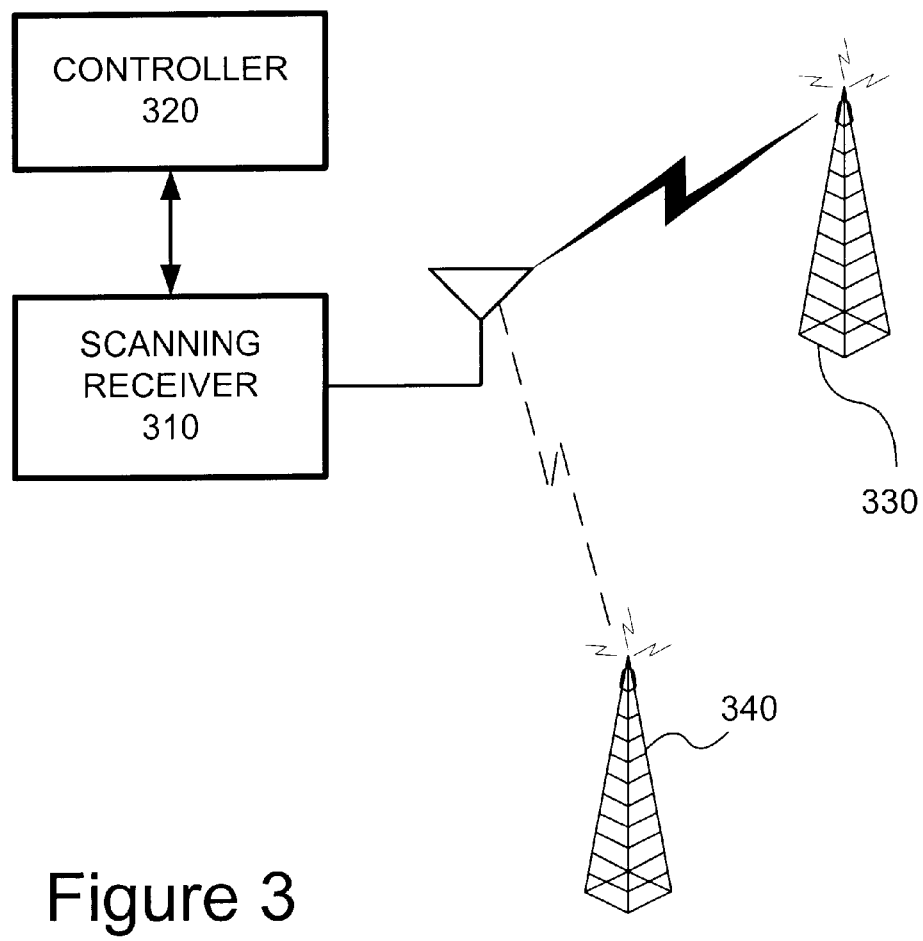
FIG. 3 illustrates a block diagram of a system for network testing in accordance with the present invention.

Referring to FIG. 3, a block diagram of a system for network testing in accordance with the present invention is illustrated. The testing apparatus has a scanning receiver 310 and a controller 320. The scanning receiver 310 is adapted to receive a plurality of channels of a base station 330 in the wireless network. The controller 320 is connected to the scanning receiver 310 and is adapted to assess signal quality for each of the channels. Once measurements have been taken for all the channels of the base station 330, the scanning receiver is free to begin testing of channels of another base station 340 in the wireless network.

The controller 320 is advantageously implemented via a microprocessor. The microprocessor may be either native to the scanning receiver 310 and programmed to implement logic according to the present invention, or linked to the scanning receiver 310 from an external computer via a data link.

It will be apparent to those skilled in the art that other variations in, for example and without limitation, calculation of an average SIR may be done with more or less than 10 SCH bursts or a normal burst as opposed to a synchronization burst can be used to assess bit error without departing from the scope of the invention as disclosed.

We claim:

1. A method for providing signal quality measurements in a receiver-based drive test for a wireless network, consisting essentially of:
    a) receiving a signal from a wireless network channel at a scanning receiver;
    b) measuring signal quality of said channel;
    c) repeating steps a) and b) for a next wireless network channel when the signal quality is at or above a threshold level;
    d) measuring co-channel interference and adjacent channel interference when the sign quality is below the threshold level; and
    e) repeating steps a) and b) for a next wireless network channel, such that time, data storage and processing power used during the drive test on measuring co-channel interference and adjacent channel interference are limited to those channels with poor signal quality.

2. The method of claim 1, further comprising initiating remedial action to improve the signal quality and availability of channels in the network.

3. The method of claim 1 wherein the wireless network comprises a plurality of base stations and wherein the receiving of signals is done for each base station within the extended geographic area covered by a drive test.

4. The method of claim 1 wherein the wireless network is a GSM network.

5. The method of claim 1 wherein the wireless network is an IS-136 network.

6. The method of claim 1 wherein the wireless network is any FDMA network.

7. The method of claim 1 wherein the signals are received from a synchronization channel.

8. The method of claim 1 wherein the signal quality for a channel comprises an estimated bit error rate from a signal degradation parameter of a physical layer modulation for the channel.

9. The method of claim 8 wherein the measuring of signal quality comprises estimating the bit error rate of a plurality of signals received over a period of approximately one-half second for the channel.

10. The method of claim 9 wherein the estimated bit error rate is converted to RXQual values in the range of RXQual0 to RXQual7.

11. An apparatus for providing signal quality measurements in a drive test for a wireless network, consisting of:
    a scanning receiver; and
    a controller connected to the scanning receiver and adapted to measure signal quality for a plurality of wireless network channels;
    wherein the scanning receiver is adapted to receive a plurality of channels of a base station in the wireless network, and wherein the controller comprises logic means to measure co-channel interference and adjacent channel interference only when the signal quality is below a threshold level such that time, data storage and processing power used during the drive test on measuring co-channel interference and adjacent channel interference are limited to those channels with poor signal quality.

12. The apparatus of claim 11 wherein the wireless network comprises a plurality of base stations and wherein the apparatus is adapted to be movable within the extended geographic area to be covered by a drive test.

13. The apparatus of claim 11 wherein the wireless network is a GSM network.

14. The apparatus of claim 11 wherein the wireless network is an IS-136 network.

15. The apparatus of claim 11 wherein the wireless network is any FDMA network.

16. The apparatus of claim 11 wherein the receiver is adapted to receive signals from a synchronization channel.

17. The apparatus of claim 11 wherein the signal quality for a channel comprises an estimated bit error rate from a signal degradation parameter of a physical layer modulation for the channel.

18. The method of claim 17 wherein the controller is adapted to estimate the bit error rate of a plurality of signals received over a period of approximately one-half second for the channel to measure signal quality.

19. The method of claim 18 wherein the controller is adapted to convert the estimated bit error rate to RXQual values in the range of RXQual0 to RXQual7.

20. The apparatus of claim 11 wherein the controller is implemented via a microprocessor selected from the type consisting of:

one native to the scanning receiver and provisioned with instructions to implement said logic; and one in a computer that is exogenous to the scanning receiver and connected thereto via a date link.

* * * * *